United States Patent Office 3,498,192
Patented Mar. 3, 1970

3,498,192
CAMERA HAVING AN AUTOMATIC FLASH-PHOTOGRAPHY MEANS
Tadashi Ito, Tokyo, Kanehiro Sorimachi, Yokohama-shi, and Mutsuhide Matsuda, Kawasaki-shi, Japan, assignors to Canon Camera Kabushiki Kaisha, Tokyo, Japan, a Japanese corporation
Filed Apr. 28, 1967, Ser. No. 634,665
Claims priority, application Japan, May 6, 1966, 41/42,157; July 8, 1966, 41/64,741
Int. Cl. G01j 1/00
U.S. Cl. 95—10         8 Claims

ABSTRACT OF THE DISCLOSURE

For daylight photography, a photoelectric element, galvanometer and scanning means control the shutter speed and diaphragm opening of a camera. Upon insertion of a flash bulb into its socket, a circuit interlocked with the focusing adjustment automatically sets the shutter speed and diaphragm opening for flash photography.

This invention relates generally to a camera having an automatic flash-photography device and, more particularly, to a camera where a flash means is built into the camera, and when a flash photograph is to be made, a flash bulb is inserted in the socket, which electrically connects the flash circuit to the camera and automatically sets the exposure at an appropriate value for flash photography.

BACKGROUND OF THE INVENTION

In conventional photography, the exposure setting of the camera must be corrected when a flash bulb is used. In particular, the diaphragm must be re-set by taking into consideration the distance from the object to be photographed, the guide number of the bulb, and the shutter speed must be adjusted to conform with the flash characteristics of the bulb used.

Further, in a conventional camera having an automatic exposure adjusting device for setting the diaphragm and/or shutter speed automatically, wherein a scanning device detects the movement of the indicator of a galvanometer in accordance with the brightness of the object to be photographed by using a photoelectric converting element, the exposure setting and/or shutter speed for daylight photography is automatically re-set in accordance with the movement of the indicator of the galvanometer. Therefore, when a flash photograph is made, the exposure value of the camera must be corrected by hand, and this has been troublesome for the operator of the camera.

Cameras wherein a flash device is built-in, and the shutter speed and/or the diaphragm is re-set at an appropriate value for flash photography by being mechanically interlocked with the socket of the flash device, have hitherto been known. In such cameras, the mechanical exposure value converting member is moved by the mechanical movement involved in inserting the flash-illuminator or the flash bulb. However, it is very difficult to adjust the mechanical converting member, and the durability thereof over a long period is poor. Also, it is difficult to build such a device into a miniature camera.

OBJECTS OF THE INVENTION

An object of the present invention is to overcome the foregoing technical drawbacks, and to provide a camera wherein it is possible to correctly and automatically convert to flash-photography.

Another object of the present invention is to provide a camera wherein the exposure value of a cemera is set at an appropriate value, automatically, actuated by electrical connection of the flash-illuminator or flash bulb.

A further object of the present invention is to provide a completely automatic exposure adjusting means for cameras having an automatic exposure adjusting means including conventional photo-electric converting element, galvanometer, and indicator scanning means.

Various other objects and advantages of the invention will become clear from the following description of two embodiments of the invention, and the novel features will be particularly pointed out in connection with the appended claims.

SUMMARY OF THE INVENTION

In accordance with the present invention, a circuit is provided wherein a variable resistance is interlocked with the focal length adjustment, and a current controlling correcting resistance, which restricts the range of movement of the indicator of a galvanometer to the flash photography range, are connected to the series circuit of the galvanometer (for regulating exposure value) and the current source therefor through a switch which is actuated by insertion of a flash-illuminator or flash bulb. The rotation of the galvanometer is limited within the flash photography range by the correcting resistance, and the position the indicator moves to is controlled by the focal length (i.e., camera-to-subject distance). The exposure setting of the camera is adjusted to be at an appropriate value for flash photography, in accordance with the indicator of the meter, by scanning the position the indicator has moved to.

THE DRAWINGS

The present invention will be more apparent from the following explanation, referring to the illustrative embodiments shown in the accompanying drawings, in which.

DESCRIPTION OF THE EMBODIMENTS

Figure 1:
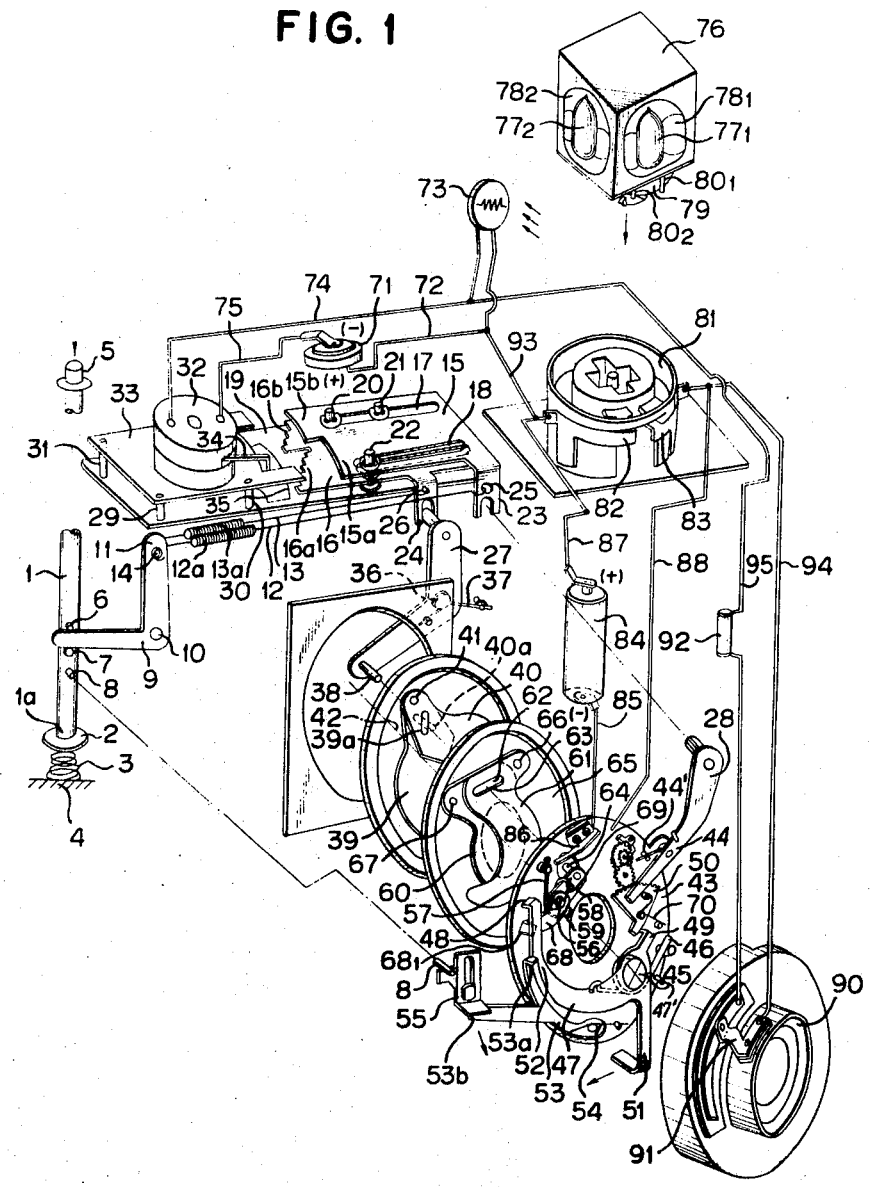
FIG. 1 is an exploded schematic representation of a first embodiment of the present invention.

Referring to FIG. 1, a shutter release rod 1 has a fringe plate 2 fixed at one end 1a thereof. An elastic spring 3, one end of which is fixed on the camera body 4, normally pushes said fringe plate 2 upwards. The other end of shutter release rod 1 is extended onto the superstructure of the camera, and is connected to a release knob 5, which is operated from the upper side of the superstructure. The spring 3 always pushes release rod 1, upwards, and therefore the knob 5 is normally positioned at its starting position. Release rod 1 has pinch pins 6 and 7 and a releasing pin 8 located thereon, pins 6 and 7 retaining one end of an L-shaped lever 9, and pin 8 being used for releasing the shutter as hereinafter described.

The L-shaped lever 9 is supported by and rotates around a shaft 10 at the junction of the two ends thereof, and along with the releasing operation in the downward direction of release rod 1, the other end 11 of lever 9 is rotated in a counterclockwise direction by the downward movement of pinch pins 6 and 7. Further, two wires 12 and 13 having respective elastic or spring portions 12a and 13a are secured at the end 11 of lever 9 through the hole 14.

Cam plates 15 and 16 constitute the indicator scanning means. Plate 15 has at least two cam surfaces 15a and 15b at the indicator hand contacting portion thereof. Similarly, cam plate 16 has two cam surfaces 16a, 16b, which are in general correspondence with the cam plate 15, but which have a plurality of stepped contact surfaces.

Sliding eslots 17 and 18 are provided on the cam plate 15 in planes normal to the optical axis of the lens system. Sliding slots are also provided on the cam plate 16 in parallel with slots 17 and 18.

Movement of plates 15 and 16 is controlled by three guide pins 20, 21 and 22 which pass through slots 17 and 18. These pins are mounted on a base plate 19 fixed on the camera body. On each pin, a washer prevents movement of the respective cam plates 15 and 16 in the axial direction of the pins. Each of cam plates 15 and 16 has a bent-down, right angle flange 23, 24, on the side thereof nearest the objective lens. Holes 25 and 26 are provided on flanges 23 and 24, respectively. The other ends of the wires 12 and 13 are secured in the holes 25 and 26. Each flange also has an open slot for engagement with transmission levers 27 and 28, respectively, for adjusting the respective individual exposure values.

The galvanometer 32 is mounted on a plate 33, which is in turn mounted over the base plate 19 by means of pins 29, 30, and 31. Plate 33 is parallel to and spaced above plate 19, so that cam plates 15 and 16 can slide within this space.

Galvanometer 32 has an indicator arm 34, the end portion of said indicator arm being bent down perpendicularly and extending through the fan shaped cut-out 35 provided on the base plate 19. The parallel portion of plate 33 is cut in the substantially same arc, so that the indicator arm can rotate freely. The sides of the cut-out portion of plate 33 act as a stopper for the indicator arm.

The transmission lever 27 is mounted on and rotates about a shaft 36. A pin on one end of lever 27 engages the open slot in flange 24 of cam plate 16. A spring 37 tends to rotate lever 27 in the clockwise direction, normally forcing the cam plate 16 to slide toward the right side of FIG. 1. This retains the cam plate at its starting position. A pin 38 is mounted on the other end of the lever 27, and passes through slots 39a, 40a provided on two diaphragm blades 39 and 40. Blades 39 and 40 are supported by a shaft pin 41, one end of which is fixed on the base plate 42. The respective slots 39a and 40a must be formed as is shown in FIG. 1, so that when lever 27 rotates in the counterclockwise direction, i.e., cam plate 16 moves to the left, diaphragm blades 39 and 40 stop down.

A pin on the end of transmission lever 28 engages the open slot in flange 23 on cam plate 15. Transmission lever 28 is supported by and rotates around a shaft 44 mounted on the base plate 43 of the shutter housing. A spring 44′ provided on the shaft 44 tends to rotate lever 28 in the clockwise direction, forcing cam plate 15 to the right, to its starting position. A drive lever 47 is also mounted on base plate 43, with a strong drive spring 46 tending to rotate it counterclockwise. Lever 47 is supported by and rotates around a shaft 45.

Lever 47 has three arms, 48, 49 and 51. Arm 48 is bent down perpendicularly. Arm 49 is bent so as to engage one end of a first fan-shaped gear 50 of a delay mechanism. Arm 51 is conveniently interlocked with the film winding mechanism (not shown), and when the film is wound, arm 51 is moved in the direction shown by the arrow in FIG. 1, and tensions drive spring 46. Further, a stop 52 is cut from lever 47 for stopping it at the tensioned position. Stop 52 presses against a bent portion 53a at one end of a three forked form stopping member 53, also supported on the base plate 43.

The stopping member 53 is biased to normally rotate in the clockwise direction by a spring 54, placed on the fulcrum thereof. The forked arm 53b is pushed downwardly (i.e. counterclockwise) at the final stroke of the shutter release by means of the pin 8 on the release rod 1. A freely sliding connecting member 55 is engaged by pin 8 and presses arm 53b down, freeing arm 53a from stop 52, releasing lever 47.

A shutter blades opening and closing member 58 is provided on the base plate 43. Member 58 is biased so as to rotate in the counterclockwise direction by means of a spring 57 for closing the shutter blades, as described below. A shaft 56 supports member 58, and spring 57 is comparatively strong, although weaker than the spring force of the drive spring 46.

Member 58 has a bent-up portion 59 at the lower portion of one end thereof, and has at the other end a pin 64 fitted through slots 62 and 63 on the shutter blades 60 and 61. When the member 58 rotates, the shutter blades 60 and 61 are reciprocatingly rotated, with the supporting pin provided on the shutter blade base plate 65 as the center, and thereby the shutter can be opened and closed. The bent portion 59 on the other end of member 58 is press-contacted against an interlocking member 68, supported coaxially with said member 58. By means of a spring 69, member 68 is biased in the counterclockwise direction. One end $68_1$ of interlocking member 68 is aslantly bent up, as shown in FIG. 1. End $68_1$ is engageable with the bent portion 48 of drive lever 47, and it is used for interlocking the driving force of the lever 52 to the opening and closing member 58. The drive lever 47 continues its rotation in the counterclockwise direction, driven by spring 46, to fully open the shutter blades 60 and 61. When the shutter blades are fully open, interlocking member 68 stops its rotation, since it is controlled by the pin 64 of the shutter blades opening and closing member 58, so that the bent portion 48 of the drive lever 47 slides on the aslantly bent up end $68_1$ of the interlocking member 68, climbs over it, and continues to rotate. When the shutter is opened by members 68 and 58, spring 57 on lever 58 is tensioned, so that when the portion 48 climbs over the portion $68_1$, levers 68 and member 58 are released, and rotate in the clockwise direction. Consequently, as the member 58 rotates, pin 64 thereon moves downwardly, so that shutter blades 60 and 61 are closed through slots 62, 63, in which the pin 64 engages.

The first fan form gear 50 is used for setting a delay time of the delay mechanism, by setting the gear in accordance with the amount of rotation of lever 47, due to the fact that a pin provided on said gear is press-contacted against the side of the end portion of transmission lever 28 by a spring 70. The position of the end of the transmission lever 28 is adjusted in accordance with the moved position of the pointer of the galvanometer 32, so that when the shutter is released, the position of the pin on the gear 50 is accordingly adjusted, and the portion of the gear 50 which contacts with portion 49 of drive lever 47 is also adjusted.

When release rod 1 releases drive lever 47, bent portion 49 of the lever 47 rotates counterclockwise to contact the end of gear 50 so as to rotate the gear 50 in the clockwise direction. Accordingly, the drive lever 47 continues its rotation until the gear portion of the gear 50 escapes from the delay mechanism, after which rotation of the lever stops by the limit pin 47′.

As an electric source for the circuit of the exposure meter, it is preferable to use a miniature type mercury battery of 1.3 v. The positive side of the battery 71 is connected to a photoconductive element 73 for measuring the illumination through a conductor 72. The resistance of element 73 varies according to the brightness of the object to be photographed, and controls the current flowing out from the battery 71. The current flows to the galvanometer 32 through a conductor 74, and the negative side of the battery is connected to the galvanometer through a conductor 75. The exposure circuit is thus formed through the connection of 71(+)–72–73–74–32–75–71(−).

Flash illuminator 76 is a newly developed plastic rectangular flash bulb assembly, commonly referred to as a "flash cube." On the respective sides thereof, flash bulbs and reflecting surfaces, e.g. $77_1$, $77_2$, $78_1$, $78_2$ are provided. This assembly flashes and rotates by 90°, and it is possible to carry out four consecutive flash photographs with this same device. A ring form bulb electrode retaining ring 79 is provided at the lower portion of the flash cube, and the electrode conductors of the respective bulbs are bent and fixed thereon. In the drawing, the electrode conductors $80_1$ and $80_2$ of the cube are fixed on retaining ring 79. Further, a cross-shaped projection is provided on the center of the lower portion of the flash cube 76, and it forms the leg portion for rotating the cube correctly by 90°. Socket 81 is provided for receiving flash cube 76, said socket being built into the camera body, and has a cross-shaped depression to receive the cross-shaped leg portion of the flash cube. Socket 81 also has electrode plates 82 and 83 for connecting electric source 84, and when the flash cube 76 is inserted into the socket, $80_1$ and 83, $80_2$ and 82 are contacted.

The electric source 84 is connected to a synchronizing contact 86 provided on the shutter base plate 43 through a conductor 85. When the synchronous contact 86 is contacted to the pin 64 provided on the shutter opening and closing member 58, the flash circuit of 84-conductor 87-electrode 82-bulb-electrode 83-conductor 88-synchronous contact 86-conductor 85, is closed, and the bulb is flashed.

Figure 3:
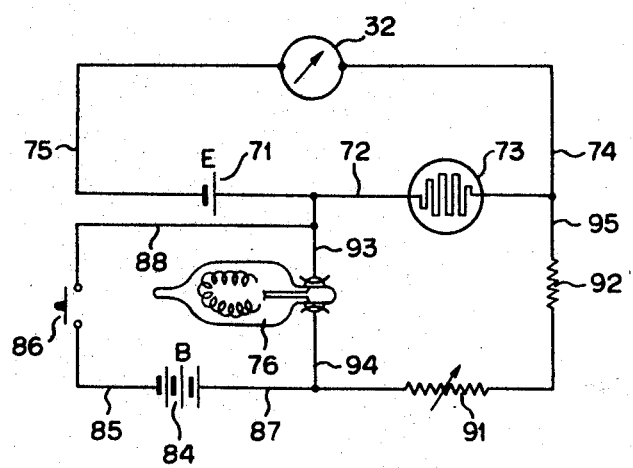
FIG. 3 is a schematic drawing showing the exposure meter and the additional circuit of the first embodiment.

Focusing ring 90 has provided thereon the variable resistance 91, the resistance of which is changed in interlocked relation with the focusing operation. In the case of flash photography, as shown in FIG. 3, when the bulb 76 is inserted, the bulb 76, the variable resistance 91 and the correcting resistance 92 are series connected across the photoconductive element 73 through the conductors 93, 94, and 95.

The operation of the camera of the present invention is explained as follows:

For daylight photography, when the camera is directed to the object to be photographed, the photoconductive element 73 changes its specific resistance in accordance with the brightness of the object. Thereby, the current value running through the exposure circuit, i.e., the battery 71(+)–72–73–74–32–75–71(−) is determined, and the indicator 34 of the galvanometer 32 is moved by a certain angle from the position as shown in FIG. 1. As the shutter release knob 5 is pushed, release rod 1 is depressed against spring 3. At this time, pinch pins 6 and 7 mounted on release rod 1 rotate lever 9 in the counterclockwise direction and, by this movement, cam plates 15, 16 are moved to the left against springs 37 and 44' provided on the transmitting levers 27 and 28, being pulled by wires 12, 13. The amount of movement of plates 15 and 16 is determined by swing angle of indicator 34. That is, both cam plates 15 and 16 are moved until they hit the indicator 34 of the galvanometer 32, in accordance with the releasing operation, at which point they are stopped.

Figure 4:
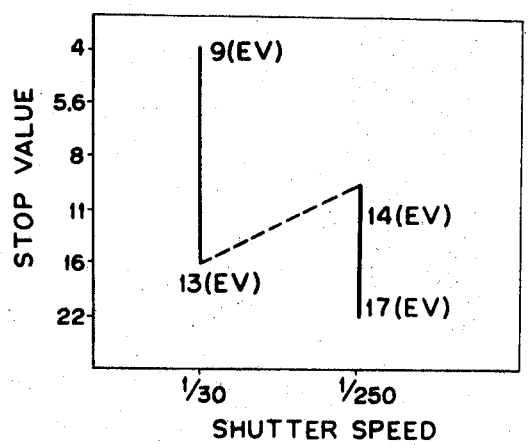
FIG. 4 is a programming diagram of the exposure value of a camera equipped with the embodiment of FIG. 1.

During movement of the cam plates the two transmission levers 27 and 28 connected thereto are rotated in the counterclockwise direction. Thus, the pin 38 provided on the end of the transmission lever 27 is moved within the slots 39a and 40a provided on the diaphragm blades 39 and 40. A certain aperture opening is thereby set in accordance with the amount of movement of the cam plate 16. In the same manner, transmission lever 28 is rotated counterclockwise by the movement of cam plate 15, and sets the starting position of gear 50, through the pin provided thereon. As the result, shutter speed and the aperture stop are adjusted as shown in FIG. 4, as the cam plates 15 and 16 are shaped as shown in FIG. 1, in accordance with the rotational angle, i.e. exposure value, of the pointer of the galvanometer. When the release rod 1 is pushed further, the coil elastic portions 12a and 13a of the elastic wires 12 and 13 are expanded. Release pin 8 on the release rod 1 rotates the stopping member 53 counterclockwise through sliding member 55, and the fitting thereof with drive lever 47 is released.

Drive lever 47 is rotated counterclockwise on shaft 45 by tensioned drive spring 46. Bent portion 48 of the end of lever 47 engages the aslant surface bent portion $68_1$ of the interlocking member 68. Member 68 rotates member 58 on shaft 56 counterclockwise by engaging bent portion 59 of the shutter opening-closing member 58. At the same time, spring 57 is tensioned for closing, and the shutter blades 60 and 61 are fully opened by pin 64. During rotation of the drive lever 47, bent portion 49 of the end thereof hits one end of the first fan-shaped gear 50 of the delay mechanism. The time during which the shutter blades are fully opened is controlled by this. As mentioned above, the starting position of gear 50 is set in accordance with the brightness of the object, i.e., the angle of the meter indicator, and therefore the shutter speed is adjusted in accordance with the brightness of the object. When the shutter blades are fully opened, bent portion 48 of the drive lever 47 slides on the slanting, curved portion $68_1$ of interlocking member 68, and is separated from $68_1$. The tensioned closing spring 57 is thereby released and the shutter opening and closing member 58 is rotated clockwise, and the shutter blades are closed. During the opening and closing of the shutter, the stopping blades 39, 40 are retained with a certain aperture.

The above mentioned operations adjust the diaphragm and shutter speed in accordance with the brightness of the object. When the shutter is wound up or cocked, and arm 51 of the drive lever 47 is rotated in the direction of an arrow in FIG. 1, bent portion 48 of the lever 47 slides at the back side of the slanting, bent portion $68_1$ and passes over said portion $68_1$, to the position shown in FIG. 1. When the knob 5 is released, cam plates 15 and 16 are returned back to their starting positions by means of the springs 37 and 44 provided on transmission levers 27 and 28.

For flash photography, flash cube 76 is inserted into socket 81 mounted on the camera. The positive side of electric source 84 gives a positive voltage to electrode 82 through conductor 87, and at the same time, the negative side is connected to the electrode 83 through synchronized contact 86 and the conductor 88. Therefore, when the synchronized contact is closed, a current is passed through one of the bulbs, and said bulb is flashed.

The exposure value is automatically set for flash photography, according to one embodiment of the present invention, as is described below with respect to FIGS. 2 to 4.

Figure 2:
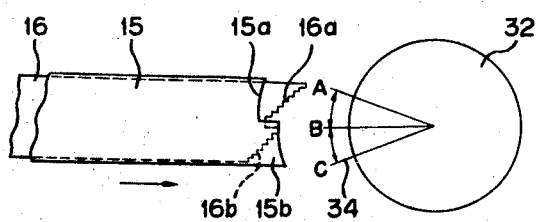
FIG. 2 is a schematic drawing showing the relationship between the galvanometer and the indicator scanning means of the embodiment shown in FIG. 1.

In FIG. 2, the cam plate 15, which controls the shutter speed, has cam stages 15a and 15b corresponding to the respective ranges A–B, and B–C of the indicator 34 of the galvanometer 32. The stages 15a and 15b are formed in the same arc as the rotational arc of the indicator 34. Consequently, when cam plate 15 moves in the direction of the arrow in FIG. 2 until it is stopped by indicator 34, it will be at one of two possible positions. According to this amount of movement of plate 15, gear 50 is adjusted through lever 28 to set the shutter speed either high, e.g. 1/250 sec. or low, e.g. 1/30 sec. Cam plate 16 controls the diaphragms, and has two stepped cam stages 16a and 16b, corresponding to cam stages 15a and 15b. Thus, when the shutter speed is set at 1/250 sec. or 1/30 sec., the diaphragm is controlled by cams 16a and 16b to cover the range from EV (exposure value) 14 to 17 or EV 9 to 13, respectively, as shown in FIG. 4.

For daylight photography, as shown in FIG. 1 and FIG. 3, battery 71, the photoconductive element 73, and the galvanometer 32 are series connected to form the exposure circuit. The indicator of the galvanometer 32 is moved in accordance with the brightness of the object seen by the photoconductive element 73, and the shutter speed and/or diaphragm are automatically adjusted.

For flash photography, when flash cube 76 is inserted into socket 81 on the camera, as is shown in FIG. 3, the flash cube 76 and variable resistance 91 interlocked to the focusing ring, and the corrected resistance 92 are series connected across the photoconductive element 73 by means of the filament of one bulb of the cube. Since the brightness of the object is low in the case of flash photography, and therefore when compared with the composite resistance of variable resistor 91 and correction resistor 92, the resistance of the photoconductive element 73 is sufficiently large, and the indicator of galvanometer 32 rotates in accordance with the resistance of the variable resistor 91. However, when the resistance of the variable resistor 91 is changed, the resistance of the correction resistor 92 must be selected so that indicator 34 moves within the range B–C, at which shutter speed should be adjusted to be low, of the range A–C in daylight photography.

Therefore, when the flash cube is inserted into the socket, indicator 34 of the meter operates within the B–C range, and the shutter speed is set low. It is automatically made to agree with the flashing characteristics of the AG–1 bulb used in the flash cube, and is set so that it can flash in synchronous operation with the shutter. At the same time, the indicator of the meter is interlocked with focusing. The closing circuit is thus composed of the battery 71(+)-the filament of the bulb 76-variable resistor 91-correction resistor 92-galvanometer 32-the battery 71(−). The position of indicator 34 of the galvanometer is determined in accordance with the varied amount of the variable resistance interlocked to the focusing. The portion 16b of cam plate 16 is formed in the form of steps, and the stopping aperture is determined through the transmission lever 27 by the distance of the subject.

It is possible to easily take ASA sensitivity into consideration by combining a variable resistance into the exposure meter circuit, and it is also possible to take the guide number into consideration by building the adding means into the variable resistor 91, as a resistance within the circuit. The portion 15a and 16a of the cam plates 15 and 16 within the movement range of A–B of the indicator 34 are not restricted to that of FIG. 1 or 2 but they can be shaped in any optional form of program.

Figure 5:
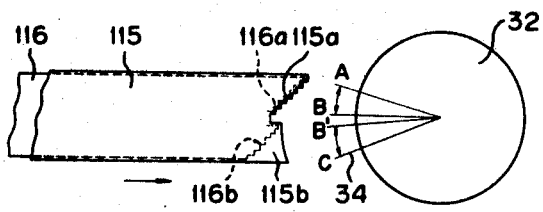
FIG. 5 is a schematic drawing, similar to FIG. 2, showing the relationship between the galvanometer and the indicator scanning means of a second embodiment of the present invention.
Figure 6:
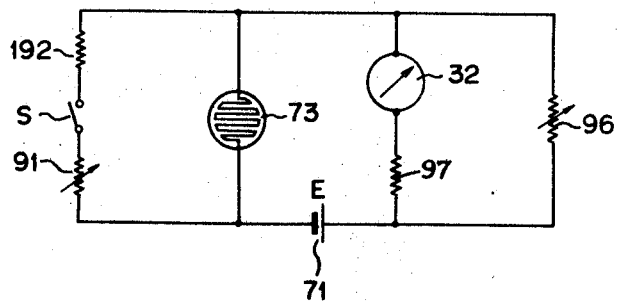
FIG. 6 is a schematic drawing showing the exposure meter and additional circuit of the FIG. 5 embodiment.

FIG. 5 and FIG. 6 show a second embodiment of the present invention. In FIG. 6, the battery 71, galvanometer 32, and the photoconductive element 73 are series connected to form the exposure circuit as in the first embodiment. A resistor 97 is series connected in the exposure meter circuit as a compensation resistor for correcting the galvanometer 32 and the photoconductive element 73. An adjustable resistance 96 is connected to the meter 32 in parallel, and the film sensitivity is provided thereon. A switch S is provided which is closed by inserting the bulb into the socket 81. When the switch S is closed, a correction resistance 192 and the variable resistance 91 (the same variable resistance as that of FIG. 1) are connected across photoconductive element 73. In this case, S is open for daylight photography, and indicator 34 can move within the range of A–B as in FIG. 5 by the current value determined by the exposure circuit. But, in the case of flash photography, S is switched in, and the indicator 34 moves within the range of B'–C, and therefore the values of the resistance 91 and 192 are determined to be smaller than the value of the photoconductive element 73.

In the second embodiment, for daylight photography, when a flash bulb is not used and switch S is open, the exposure circuit is operated and indicator 34 of the meter operates within the range of A–B in accordance with the brightness of the object. When the shutter releasing operation is carried out, cam plates 115 and 116 are moved in the direction shown by an arrow of FIG. 5. The cam portions 115a and 116a hit indicator 34, and by the amount of the movement of the plates, transmission levers 27 and 28 are rotated to determine the diaphragm and the shutter speed in the same manner as in the first embodiment.

When a bulb is inserted into socket 81, switch S is closed, and in parallel with the photoconductive element 73, the series circuit of resistance 91 interlocked with the focusing and correction resistance 192 are connected. In this case, the resistivity of photoconductive element 73 is large, and the movement of indicator 34 is mainly affected by variable resistance 91.

As mentioned above, in this case movement of indicator 34 is within the range of B'–C. The cams 115 and 116 move in the direction shown by the arrow, and they hit the indicator 34 and stop. Cam portion 115b of the cam 115 determines shutter speed, and is formed in the same arc as the rotary arc of indicator 34. Therefore, regardless of the position of indicator 34, the shutter speed is constant, i.e., the shutter speed is set at, for example, $\frac{1}{30}$ sec. or $\frac{1}{60}$ sec.

Cam 116 for stopping has stepped cam portion 116b formed thereon, and therefore by means of the movement of indicator 34, i.e., by means of resistance 91 for photographing distance, and resistance 96 for ASA, the position thereof can be determined, and the diaphragm is set. Cam 116b is prepared so that it agrees with the guide number.

In the second embodiment, the range of movement of the two cams and of the indicator are different for daylight photography and flash photography. The difference between the first and second embodiments of the present invention is that, in the first embodiment, indicator 34 moves in the same range for daylight photography and for flash photography. In accordance with the second embodiment, the range of the movement of the indicator is different for daylight photography and flash photography. Therefore, when the bulbs to be used are specified, i.e., when the AG–1 bulb is used, the first embodiment is more appropriate. When various kinds of bulbs are to be used, the second embodiment is more appropriate as the range of the movement of the indicator is increased in accordance with the bulb to be used, as the number of cam portions (or steps) on the scanning means is increased. In the second embodiment, the circuit as is shown in FIG. 6 is preferred, but this is not a necessary feature. The circuit structure as is shown in FIG. 3 may also be employed.

A flash cube has been used as the flash illuminator in describing the invention, but it is not necessary that this new type bulb be employed. Conventional bulbs can also be used.

Further, the present invention is not restricted to cameras having flash illuminators built therein. It is possible to employ the present invention with a flash-gun, and when it is attached to the camera, the switch S (see FIG. 6) is automatically closed in synchronous operation with the attached flash-gun.

The present invention provides an automatic flash mechanism according to which the exposure value can be automatically set, by electric means, at an appropriate value, by merely inserting a flash bulb. More particularly, the present invention provides an automatic flash mechanism using electric means and which controls the range of movement of the galvanometer indicator. In accordance with the present invention, a conventional camera having an automatic exposure adjusting means may be simply converted. No extra members are required to carry out the operation of the automatic flash mechanism. The durability of the means of this invention is excellent, and it may be constructed in a very limited space.

It is to be understood that the present invention can be applied to cameras having conventional exposure mechanisms and different shutter and indicating means from those described herein.

In the respective embodiments of this invention, two cam plates are employed to automatically adjust the diaphragm and shutter speed, but the invention is not restricted to this. One cam plate can be used and either the diaphragm or shutter speed can be automatically adjusted.

Various other changes in the details, steps, materials and arrangements of parts may be made by those skilled in the art within the principle and scope of the invention as defined in the appended claims and their equivalents.

What is claimed is:

1. In a camera having adjustable exposure means, the combination comprising:
   a galvanometer having a moveable indicator; a battery connected in series with said galvanometer;
   a photoconductive element connected in series with said galvanometer and said battery and forming a closed circuit;
   movable scanning means responsive to said indicator;
   means operably connecting said scanning means and said adjustable exposure means;
   a flash-illuminator socket and a resistance connected in series with said galvanometer and said battery and in parallel with said photoconductive element;
   the varying resistance of said photoconductive element controlling movement of said indicator when said socket is empty,
   and the value of said resistance being such that, when a flash-illuminator is inserted in said socket and the circuit is closed, said scanning means and means connected thereto, control movement of said indicator and set said exposure means for flash photography.

2. The camera claimed in claim 1, wherein said camera also has a focal length adjustment, and said resistance comprises a variable resistor interlocked with said focal length adjustment, and a fixed, correcting resistance.

3. The camera as claimed in claim 1, wherein said adjustable exposure means comprise a variable diaphragm and a shutter speed control, and said moveable scanning means comprise a pair of cam plates moveable into contact with said indicator, one said plate being connected to said diaphragm and the other said plate being connected to said shutter speed control.

4. The camera as claimed in claim 1, and additionally comprising a switch closed by insertion of a flash illuminator into said socket, whereby said circuit is closed.

5. The camera as claimed in claim 2, wherein said resistance additionally comprises a second variable resistance.

6. In a camera having means for adjusting the diaphragm opening, the shutter speed and the focal length, the improvement comprising:
   a battery, a galvanometer having a moveable indicator, and a photoconductive element connected in series and forming a closed circuit;
   a first cam responsive to movement of said indicator and operably connected to control the opening of said diaphragm;
   a second cam responsive to movement of said indicator and operable to control the speed of said shutter;
   a resistance and switch means connected in series with said galvanometer and battery, and in parallel with said photoconductive element said resistance comprising a variable resistor interlocked with said focal length adjusting means and a fixed, correcting resistor;
   the value of said resistance being lower than the resistance of said photoconductive element, so that when said switch is closed said indicator and cams set said diaphragm opening and shutter speed for flash photography.

7. The camera as claimed in claim 6, wherein said switching means comprises a flash-illuminator and a socket therefor, insertion of said illuminator into said socket closing said circuit.

8. The camera as claimed in claim 6, wherein the resistance value of said photoconductive element and the resistance value of said resistance are such that said indicator moves in a first range when said switching means is open and a second range when said switching means is closed.

References Cited

UNITED STATES PATENTS 3,344,724  10/1967  Taguchi _____ 95—10

JOHN M. HORAN, Primary Examiner

U.S. Cl. X.R.

95—11, 11.5